US008906499B2

(12) United States Patent
Gervasi et al.

(10) Patent No.: US 8,906,499 B2
(45) Date of Patent: Dec. 9, 2014

(54) PASSIVATED ALUMINUM NITRIDE FOR ENHANCED THERMAL CONDUCTIVITY COMPOSITE MATERIALS FOR FUSER BELTS

(71) Applicant: Xerox Corporation, Norwalk, CT (US)

(72) Inventors: David J. Gervasi, Pittsford, NY (US); Matthew M. Kelly, West Henrietta, NY (US); Santokh Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/171,883

(22) Filed: Feb. 4, 2014

(65) Prior Publication Data

US 2014/0151597 A1 Jun. 5, 2014

Related U.S. Application Data

(62) Division of application No. 12/479,117, filed on Jun. 5, 2009, now Pat. No. 8,679,624.

(51) Int. Cl.
*B32B 5/16* (2006.01)
*B32B 27/28* (2006.01)

(52) U.S. Cl.
USPC ......... 428/328; 428/473.5; 428/421; 428/500

(58) Field of Classification Search
USPC ............................... 428/328, 473.5, 421, 500
See application file for complete search history.

(56) References Cited

U.S. PATENT DOCUMENTS

| | | | |
|---|---|---|---|
| 5,627,107 | A | 5/1997 | Howard |
| 2004/0180209 | A1 | 9/2004 | Cheng et al. |
| 2007/0166544 | A1 | 7/2007 | Hennemann et al. |
| 2010/0025823 | A1 | 2/2010 | Collazo et al. |

FOREIGN PATENT DOCUMENTS

| | | |
|---|---|---|
| DE | 3433879 | 3/1986 |
| JP | 9-137060 | 5/1997 |
| JP | H10268675 | 10/1998 |
| JP | 2005-17720 | 1/2005 |

OTHER PUBLICATIONS

Chen, X., Gonsalves, K.E. Journal of Materials Research, vol. 12, No. 5, p. 1274-1286, May 1997.*

Chen, Xiaohe et al. Synthesis and properties of an aluminum nitride/polyirnide nanocomposite prepared by a nonaqueous suspension process. Journal of Materials Research, May 1997, vol. 12, No. 5, pp. 1274-1286.

European Patent Office, Partial European Search Report, European Application No. 10164225.4, Oct. 5, 2010, 5 Pages.

Chen, Xiaohe, Kenneth E. Gonsalves, Gun-Moong Chow and Tongsan D. Xiao, "Homogeneous Dispersion of Nanostructured Aluminum Nitride in a Polyimide Matrix," Advanced Materials, vol. 6, No. 6, Jun. 1, 1994, pp. 481-484.

* cited by examiner

*Primary Examiner* — Robert D. Harlan
(74) *Attorney, Agent, or Firm* — MH2 Technology Law Group LLP

(57) ABSTRACT

In accordance with the present teachings, there are composite materials, fuser members comprising the composite materials, and methods of making the composite materials. In various embodiments, the composite material can include a polyimide resin having a thermal conductivity and a plurality of passivated aluminum nitride particles substantially uniformly dispersed in the polyimide resin to provide the composite material with a thermal conductivity of about 0.4 W/mK to about 2.5 W/mK, and wherein each of the plurality of passivated aluminum nitride particles can include a passivation layer disposed over an aluminum nitride particle core to inhibit oxidation and thermal degradation of a surface of the aluminum nitride particle core.

6 Claims, 7 Drawing Sheets

PASSIVATED ALUMINUM NITRIDE FOR ENHANCED THERMAL CONDUCTIVITY COMPOSITE MATERIALS FOR FUSER BELTS

CROSS REFERENCE TO RELATED APPLICATION

This application is a divisional of U.S. patent application Ser. No. 12/479,117 filed Jun. 5, 2009, the entirety of which is hereby incorporated by reference.

FIELD OF USE

The present teachings relate to electrostatography and electrophotography and, more particularly, to composite materials with improved thermal conductivity for fuser belt applications.

BACKGROUND

Fillers are incorporated into fuser materials to achieve higher thermal conductivity. However, incorporation of thermally conductive fillers into fuser materials results in an increase in hardness of the composite fuser material. Thus it is one limiting factor in developing thermally conductive materials for fuser applications. It is desirable to have particles with very high thermal conductivity in order to impart the highest level of thermal conductivity to the fuser while at the same time balancing the appropriate physical properties of the resulting composite. Aluminum nitride has been used as a thermally conductive filler in fuser materials in the past but is limited by its inherent thermal instability. Composites of fluoroelastomers including aluminum nitride have been found to be thermally instable and the exothermic reaction of crosslinking by-products of the composite has prohibited their use.

Accordingly, there is a need to overcome these and other problems of prior art to provide new composite materials with improved thermal conductivity.

SUMMARY

In accordance with various embodiments, there is a composite material. The composite material can include a polyimide resin having a thermal conductivity and a plurality of passivated aluminum nitride particles substantially uniformly dispersed in the polyimide resin to provide the composite material with a thermal conductivity of about 0.4 W/mK to about 2.5 W/mK, and wherein each of the plurality of passivated aluminum nitride particles can include a passivation layer disposed over an aluminum nitride particle core to inhibit oxidation and thermal degradation of a surface of the aluminum nitride particle core.

According to various embodiments, there is a composite material. The composite member can include at least one of a fluoropolymer or a fluoroelastomer and a plurality of passivated aluminum nitride particles substantially uniformly dispersed in at least one of the fluoropolymer or the fluoroelastomer to provide the composite material with a thermal conductivity of about 0.4 W/mK to about 2.5 W/mK, and wherein each of the plurality of passivated aluminum nitride particles can include a passivation layer disposed over an aluminum nitride particle core to inhibit oxidation and thermal degradation of a surface of the aluminum nitride particle core.

According to various embodiments, there is a composite material. The composite member can include a silicone elastomer having a thermal conductivity and a plurality of passivated aluminum nitride particles substantially uniformly dispersed in the silicone elastomer to provide the composite material with a thermal conductivity of about 0.4 W/mK to about 2.5 W/mK, and wherein each of the plurality of passivated aluminum nitride particles can include a passivation layer disposed over an aluminum nitride particle core to inhibit oxidation and thermal degradation of a surface of the aluminum nitride particle core.

According to yet another embodiment, there is a method of making a composite material. The method can include providing a plurality of aluminum nitride particles and forming a passivation layer over each of the plurality of aluminum nitride particles to form a plurality of passivated aluminum nitride particles, wherein the passivation layer provides inhibition to oxidation and thermal degradation of a surface of the aluminum nitride particles. The method can further include dispersing the plurality of passivated aluminum nitride particles—in a polymer to provide a thermal conductivity of about 0.4 W/mK to about 2.5 W/mK of the composite material.

Additional advantages of the embodiments will be set forth in part in the description which follows, and in part will be obvious from the description, or may be learned by practice of the present teachings. The advantages will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and together with the description, serve to explain the principles of the present teachings.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
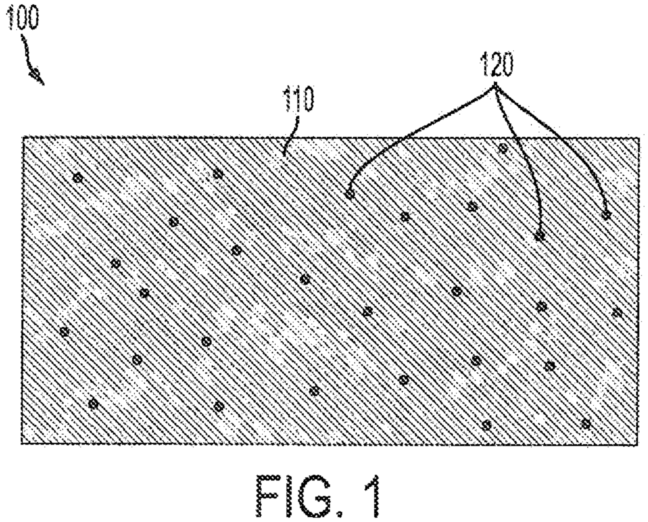
FIG. 1 schematically illustrates a cross section of a composite material, in accordance with various embodiments of the present teachings.
Figure 2:
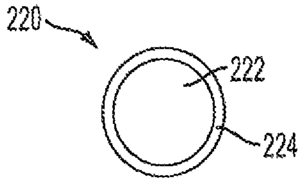
FIGS. 2 and 3 schematically illustrate exemplary passivated aluminum nitride particles, according to various embodiments of the present teachings.
Figure 3:
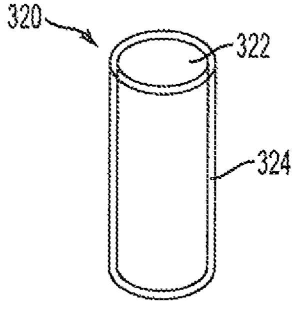

FIG. 1 schematically illustrates a composite material 100 in accordance with various embodiments of the present teachings. In some embodiments, the composite material 100 can include a polyimide resin 110 having a thermal conductivity in the range of about 0.2 W/mK to about 0.4 W/mK and a plurality of passivated aluminum nitride particles 120 substantially uniformly dispersed in the polyimide resin 110 to provide an increase in a thermal conductivity of the composite material by up to about 500% over the thermal conductivity of the polyimide resin. In various embodiments, the composite material 100 can have a thermal conductivity in the range of about 0.4 W/mK to about 2.5 W/mK and in some cases in the range of about 0.5 W/mK to about 1.5 W/mK. In some cases, the plurality of passivated aluminum nitride particles 120 can be present in an amount ranging from about 0.01 weight % to about 50 weight % and in other cases from about 3 weight % to about 35 weight % of the total weight of the composite material 100. In some embodiments, the plurality of passivated aluminum nitride particles 120 can include one or more of spherical particles 220, as shown in FIG. 2 and high aspect ratio particles 320, as shown in FIG. 3. In various embodiments, each of the plurality of passivated aluminum nitride particles 120, 220, 320 can have at least one dimension in the range of about 5 nm to about 5 μm and in some cases from about 10 nm to about 2 μm. Furthermore, as shown in FIGS. 2 and 3, each of the plurality of passivated aluminum nitride particles 120, 220, 320 can include a passivation layer 224, 324 disposed over an aluminum nitride particle core 222, 322 such that the passivation layer 224, 324 can provide inhibition to oxidation and thermal degradation of the surface of the aluminum nitride particle core 222, 322.

In various embodiments, the passivation layer 224, 324 including polyimide can be formed by condensation reaction of polyimide precursor monomers such as, for example, 4,4'-oxydianiline with pyromellitic dianhydride, as shown below:

(1)

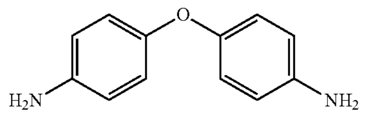

4,4'-Oxydianiline

+ +

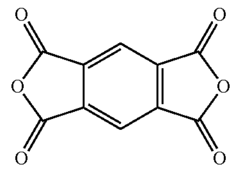

Pyromellitic Dianhydride (PMDA)

-continued

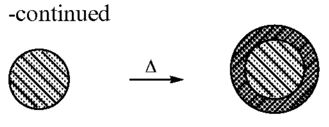

The condensation reaction (1) can be carried out at a temperature in the range of about 25° C. to about 200° C. In certain embodiments, the passivation layer 224, 324 can be formed using other suitable polyimide precursor monomers, including, but not limited to, polyamic acid, BTDA (benzophenonetetracarboxylic acid), 1,4-benzenediamine, MPD (4,4'-methylenebisbenzeneamine), and BTDE (4,4'-carbonylbis(1,2-benzenedicarboxylic acid). The thickness and surface roughness of the passivation layer 224, 324 can be controlled by process conditions, such as, for example, reaction time, temperature of the reaction medium, and monomer concentration.

In various embodiments, the composite material 100 including a polyimide resin 110 and a plurality of passivated aluminum nitride particles 120, 220, 320 can be used as a substrate of a belt fuser or other belt component requiring higher thermal conductivity than currently used materials. While not intending to be bound by any specific theory, it is believed that the composite material 100 should result in improved thermal transfer and should allow either lower energy consumption or faster process speeds in a fuser subsystem of an electrophotographic system and/or an electrostatographic system.

In some embodiments, the composite material 100, as shown in FIG. 1 can include one or more of a fluoropolymer and a fluoroelastomer 110 having a thermal conductivity in the range of about 0.2 W/mK to about 0.4 W/mK and a plurality of passivated aluminum nitride particles 120 substantially uniformly dispersed in the one or more of a fluoropolymer and a fluoroelastomer 110 to provide an increase in a thermal conductivity of the composite material 100 by up to about 500% over the thermal conductivity of the one or more of a fluoropolymer and a fluoroelastomer 110. In various embodiments, the composite material 100 can have a thermal conductivity in the range of about 0.5 W/mK to about 2.5 W/mK and in some cases in the range of about 0.5 W/mK to about 1.5 W/m. Exemplary fluoropolymer and fluoroelastomer can include, but are not limited to, polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

As shown in FIGS. 2 and 3, each of the plurality of passivated aluminum nitride particles 120, 220, 320 can include a passivation layer 224, 324 disposed over an aluminum nitride particle core 222, 322. In some embodiments, the passivation layer 224, 324 can provide inhibition to oxidation and thermal degradation of the surface of the aluminum nitride particle core 222, 322. In other embodiments, the passivation layer 224, 324 can improve dispersion of the aluminum nitride particles 120, 220, 320 in the one or more of a fluoropolymer and a fluoroelastomer 110. In some other embodiments, the passivation layer 224, 324 can increase physical properties, such as, for example, durometer hardness, tensile strength, ultimate elongation, toughness, and initial modulus of the one or more of a fluoropolymer and a fluoroelastomer 110.

The passivation layer 224, 324 can be formed by condensation reaction of one or more fluorinated monomers such as, for example, fluoro-phenylenediamine, tetrafluoro-phthalic anhydride, vinylidene fluoride, hexafluoropropylene, tetrafluoroethylene, chlorotrifluoroethylene, and perfluoromethylvinylether, as shown below:

(2)

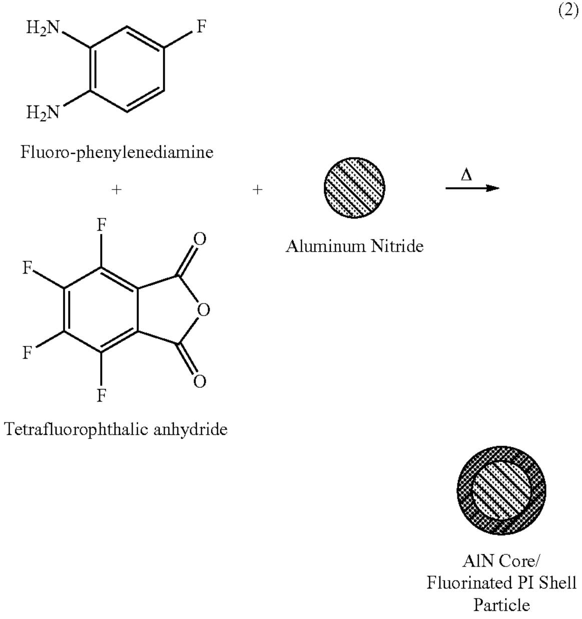

The condensation reaction (2) can be carried at a temperature in the range of about 25° C. to about 200° C. While fluorinated polyimide-based monomers are shown in the reaction scheme 2, any other suitable fluorinated monomers can be used as well.

In various embodiments, the composite material 100 including one or more of a fluoropolymer and a fluoroelastomer 110 and a plurality of passivated aluminum nitride particles 120, 220, 320 can be used as a top coat material for a belt fuser or for other belt component requiring higher thermal conductivity. While not intending to be bound by any specific theory, it is believed that the composite 100 can result in improved thermal transfer and should allow either lower energy consumption or faster process speeds in a fuser subsystem of an electrophotographic system and/or an electrostatographic system.

In some embodiments, the composite material 100, as shown in FIG. 1 can include a silicone elastomer 110 having a thermal conductivity and a plurality of passivated aluminum nitride particles 120 substantially uniformly dispersed in the silicone elastomer 110, to provide an increase in a thermal conductivity of the composite material 100 by up to about 500% over the thermal conductivity of the silicone elastomer 110. In various embodiments, the composite material 100 can have a thermal conductivity in the range of about 0.5 W/mK to about 2.5 W/mK and in some cases in the range of about 0.5 W/mK to about 1.5 W/m. Any suitable silicone elastomer 110 can be used including, but not limited to, silicone rubbers such as room temperature vulcanization (RTV) silicone rubbers; high temperature vulcanization (HTV) silicone rubbers; and low temperature vulcanization (LTV) silicone rubbers. Exemplary commercially available silicone rubbers include, but is not limited to, SILASTIC® 735 black RTV and SILASTIC® 732 RTV (Dow Corning Corp., Midland, Mich.); and 106 RTV Silicone Rubber and 90 RTV Silicone Rubber (General Electric, Albany, N.Y.). Other suitable silicone materials include, but are not limited to, Sylgard® 182 (Dow Corning Corp., Midland, Mich.) siloxanes (preferably polydimethylsiloxanes); fluorosilicones such as Silicone Rubber 552 (Sampson Coatings, Richmond, Va.); dimethylsilicones; liquid silicone rubbers such as, vinyl crosslinked heat curable rubbers or silanol room temperature crosslinked materials; and the like.

As shown in FIGS. 2 and 3, each of the plurality of passivated aluminum nitride particles 120, 220, 320 can include a passivation layer 224, 324 disposed over an aluminum nitride particle core 222, 322. In some embodiments, the passivation layer 224, 324 can be formed by thermal reaction of silicone elastomeric oligomers with aluminum nitride particles, such as, for example, a low molecular weight silanol functional polydimethylsiloxane where R=—OH, x=1-10, y=0-5, as shown below:

(3)

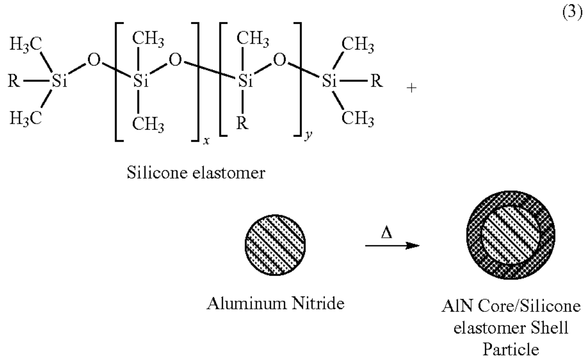

Any other suitable silicone structure and precursor monomer, including, but not limited to, chlorosilanes and trimethoxysilanes can be used in the reaction scheme (3). In various embodiments, the composite material 100 including a silicone based elastomer 110 and a plurality of passivated aluminum nitride particles 120, 220, 320 can be used to form a compliant layer in a belt fuser or for other belt component requiring higher thermal conductivity than currently used materials.

Figure 4:
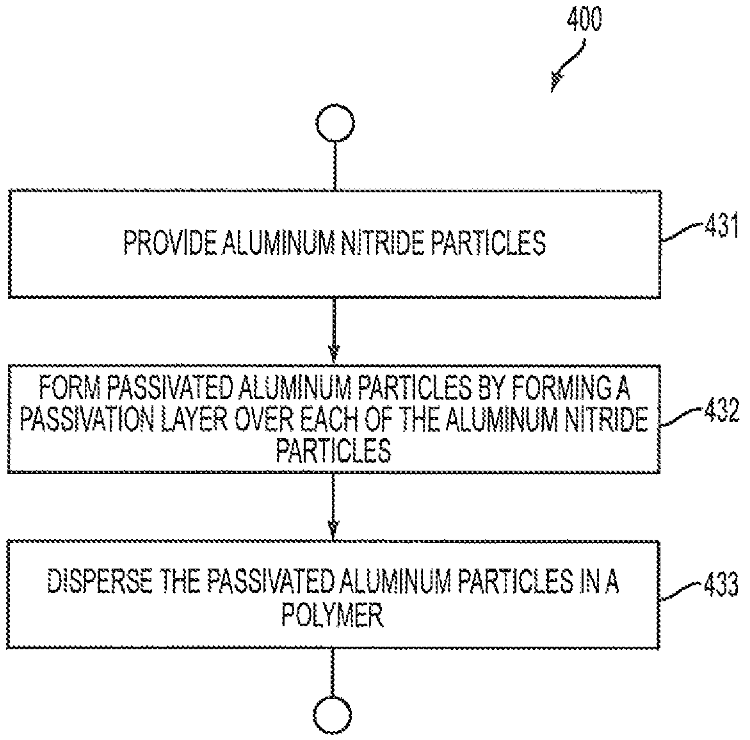
FIG. 4 shows an exemplary method of making a composite material, according to various embodiments of the present teachings.

According to various embodiments, there is a method 400 of making a composite material, as shown in FIG. 4. The method 400 can include providing a plurality of aluminum nitride particles, as in step 431 and forming a passivation layer over each of the plurality of aluminum nitride particles to form a plurality of passivated aluminum nitride particles, as in step 432. In various embodiments, the passivation layer can provide inhibition to oxidation and thermal degradation of the surface of the aluminum nitride particles with respect to undesirable reactions. The method 400 can also include a step 433 of dispersing the plurality of passivated aluminum nitride particles in a polymer to provide a thermal conductivity of about 0.4 W/mK to about 2.5 W/mK of the composite material. Furthermore, the passivation layer can improve dispersion of the passivated aluminum nitride particles in the polymer, inhibit unfavorable reactions with the polymer, and increase thermal conductivity and physical properties such as, for example, durometer hardness, tensile strength, ultimate elongation, toughness, and initial modulus.

In some embodiments, the step 432 of forming a passivation layer over each of the plurality of aluminum nitride particles can include adding one or more monomers including, but not limited to, 4,4'-oxydianiline, pyromellitic dianhydride, polyamic acid, BTDA (benzophenonetetracarboxylic acid), 1,4-benzenediamine, MPD (4,4'-methylenebisbenzeneamine), and BTDE (4,4'-carbonylbis(1,2-benzenedicarboxylic acid) and the like to the plurality of aluminum nitride particles to form a mixture and heating the mixture at a temperature in the range of about 25° C. to about 200° C. to form a passivation layer including the condensation reaction products of the one or more monomers over each of the plurality of aluminum nitride particles, as shown in the reaction scheme (1). In various embodiments, the step of dispersing the plurality of passivated aluminum nitride particles in a polymer can include dispersing the plurality of passivated aluminum nitride particles in a polyimide, such as, for example, polyphenylene sulfide, polyamide imide, polyketone, polyphthalamide, polyetheretherketone, polyethersulfone, polyetherimide, and polyaryletherketone.

In other embodiments, the step 432 of forming a passivation layer over each of the plurality of aluminum nitride particles can include adding one or more monomers such as, for example, fluoro-phenylenediamine, tetrafluoro-phthalic anhydride, vinylidene fluoride, hexafluoropropylene, tetrafluoroethylene, chlorotrifluoroethylene, and perfluoromethylvinylether to the plurality of aluminum nitride particles to form a mixture and heating the mixture at a temperature in the range of about 25° C. to about 200° C. to form a passivation layer including the condensation reaction products of the one or more monomers over each of the plurality of aluminum nitride particles, as shown in the reaction scheme (2). In various embodiments, the step of dispersing the plurality of passivated aluminum nitride particles in a polymer can include dispersing the plurality of passivated aluminum nitride particles in at least one of a fluoropolymer and a fluoroelastomer, such as, for example, tetrafluoroethylene, perfluoro(methyl vinyl ether), perfluoro(propyl vinyl ether), perfluoro(ethyl vinyl ether), vinylidene fluoride, hexafluoropropylene, polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

In other embodiments, the step 432 of forming a passivation layer over each of the plurality of aluminum nitride particles can include adding one or more silicone elastomeric oligomers to the plurality of aluminum nitride particles to form a mixture and heating the mixture at a temperature in the range of about 25° C. to about 200° C. to form a passivation layer including the condensation reaction products of the one or more monomers over each of the plurality of aluminum nitride particles, as shown in the reaction scheme 3. In various embodiments, the step of dispersing the plurality of passivated aluminum nitride particles in a polymer can include dispersing the plurality of passivated aluminum nitride particles in silicone elastomer, such as, for example, silicone rubbers such as room temperature vulcanization (RTV) silicone rubbers; high temperature vulcanization (HTV) silicone rubbers; and low temperature vulcanization (LTV) silicone rubbers. Exemplary commercially available silicone rubbers include, but is not limited to, SILASTIC® 735 black RTV and SILASTIC® 732 RTV (Dow Corning Corp., Midland, Mich.); and 106 RTV Silicone Rubber and 90 RTV Silicone Rubber (General Electric, Albany, N.Y.). Other suitable silicone materials include, but are not limited to, Sylgard® 182 (Dow Corning Corp., Midland, Mich.) siloxanes (preferably polydimethylsiloxanes); fluorosilicones such as Silicone Rubber 552 (Sampson Coatings, Richmond, Va.); dimethylsilicones; liquid silicone rubbers such as, vinyl crosslinked heat curable rubbers or silanol room temperature crosslinked materials; and the like.

Figure 5:
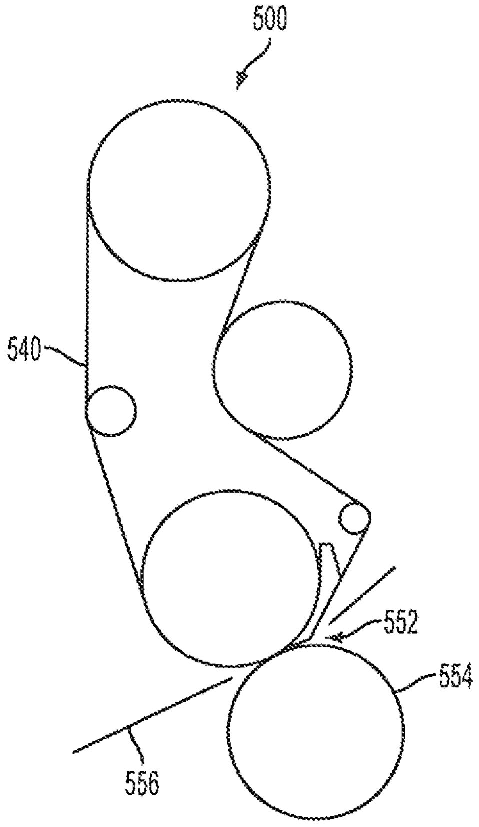
FIG. 5 schematically illustrates an exemplary fusing subsystem, according to various embodiments of the present teachings.
Figure 6:
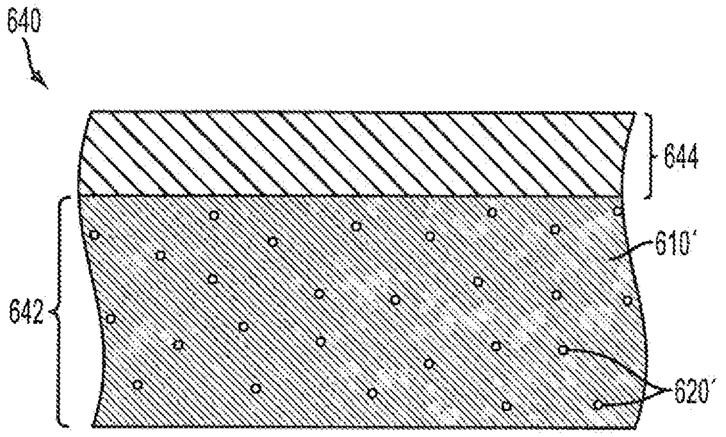
FIGS. 6-12 schematically illustrate cross sections of various exemplary fuser members, in accordance with various embodiments of the present teachings.

FIG. 5 schematically illustrates an exemplary fusing subsystem 500, according to various embodiments of the present teachings. The fusing subsystem 500 can include a fuser member 540 in a belt configuration and a rotatable pressure roll 554 that can be mounted forming a fusing nip 552. A media 556 carrying an unfused toner image can be fed through the fusing nip 552 for fusing. FIG. 6, schematically illustrates a cross section of an exemplary fuser belt 540, 640, in accordance with various embodiments of the present teachings. The exemplary fuser belt 640 can include a substrate 642 including a plurality of passivated aluminum nitride particles 620' substantially uniformly dispersed in a polyimide 610', such that the plurality of passivated aluminum nitride particles 620' can increase a thermal conductivity of the substrate 642. Each of the plurality of passivated aluminum nitride particles 620' can include a passivation layer 224, 324 disposed over an aluminum nitride particle core 222, 322, as shown in FIGS. 2 and 3. Furthermore, the plurality of passivated aluminum nitride particles 620' can be formed as shown in the reaction scheme (1). The exemplary fuser belt 640 can also include a top coat layer 644 disposed over the substrate 642, the top coat layer 644 can include one or more of a fluoropolymer, and a fluoroelastomer, wherein the one or more of a fluoropolymer and a fluoroelastomer can include one or more monomer repeat units such as, for example, tetrafluoroethylene, perfluoro(methyl vinyl ether), perfluoro (propyl vinyl ether), perfluoro(ethyl vinyl ether), vinylidene fluoride, hexafluoropropylene, and the mixtures thereof. Exemplary top coat layer 1144 can include, but is not limited to, polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

Figure 7:
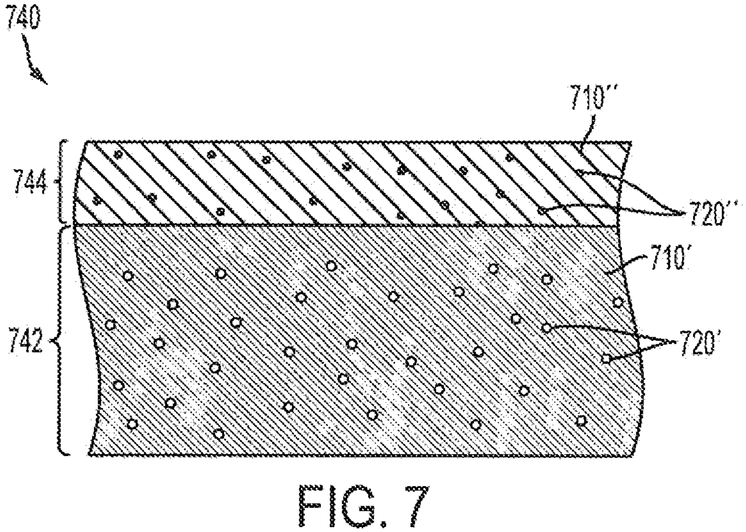

FIG. 7 shows another exemplary embodiment 740 of the fuser belt 540, 640. The fuser belt 740 can include a top coat layer 744 disposed over a substrate 742, the substrate a substrate 742 including a plurality of passivated aluminum nitride particles 720' substantially uniformly dispersed in a polyimide 710'. Furthermore, the top coat layer 744 can include a plurality of passivated aluminum nitride particles 720" substantially uniformly dispersed in at least one of a fluoropolymer and a fluoroelastomer 710", such that the plurality of passivated aluminum nitride particles 720" can increase a thermal conductivity of the top coat layer 744. In various embodiments, each of the plurality of passivated aluminum nitride particles 720" can include a passivation layer 224, 324 disposed over the aluminum nitride particle core 222, 322, as shown in FIGS. 2 and 3. In certain embodiments, the passivation layer 224, 432 including the condensation reaction products of fluorinated monomers can be formed as shown in the reaction scheme (2).

Figure 8:
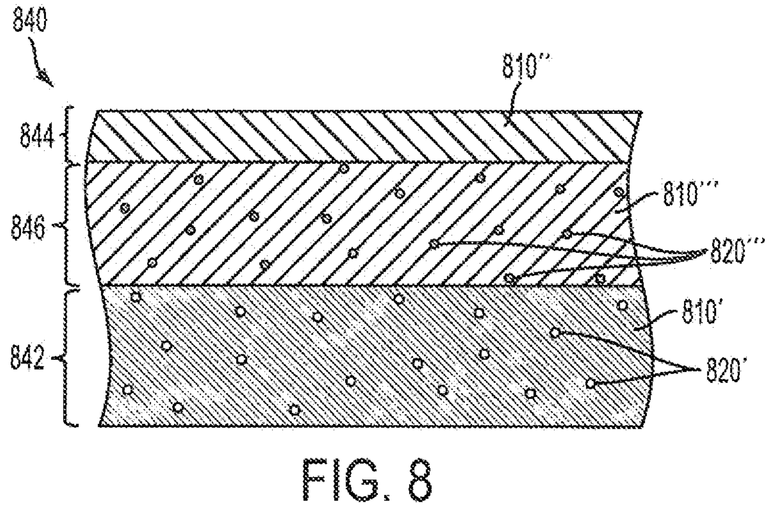

FIG. 8 shows another exemplary embodiment 840 of the fuser belt 540, 640, 740. The fuser belt 840, as shown in FIG. 8 can also include a compliant layer 846 disposed over a substrate 842 and a top coat layer 844 disposed over the compliant layer 846. In some embodiments, the compliant layer 846 can include a plurality of passivated aluminum nitride particles 820''' substantially uniformly dispersed in a silicone elastomer 810'''. Each of the plurality of passivated aluminum nitride particles 820''' can include a passivation layer 224, 324 disposed over an aluminum nitride particle core 222, 322, as shown in FIGS. 2 and 3. In various embodiments, the passivation layer 224, 324 including silicone elastomeric oligomers can be formed as shown in the reaction scheme 3. The substrate 842 can also include a plurality of passivated aluminum nitride particles 820' substantially uniformly dispersed in a polyimide 810'.

Figure 9:
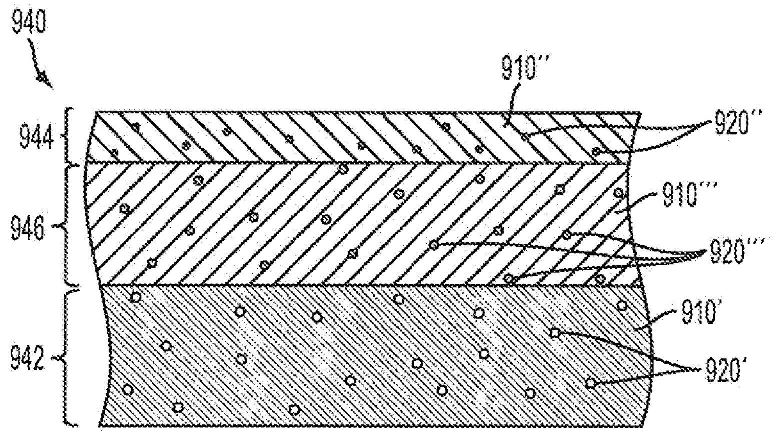

FIG. 9 shows another exemplary embodiment 940 of the fuser belt 540, 640, 740, 840, where each of the three layers, the substrate 942 including a polyimide 910', a compliant layer 946 including a silicone elastomer 910''' disposed over the substrate 942, and a top coat layer 944 including one or more of a fluoroelastomer and a fluoropolymer 910" disposed over the compliant layer 946 can include passivated aluminum nitride particles, 920', 920", 920''' respectively.

Figure 10:
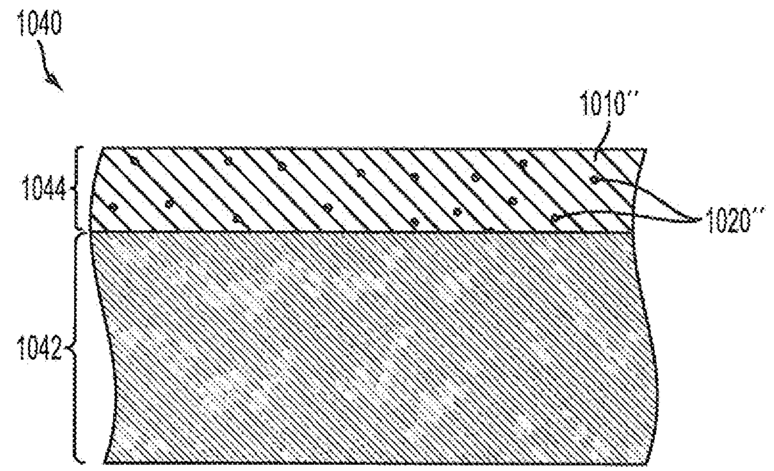

FIG. 10 schematically illustrates a cross section of another exemplary fuser belt 540, 1040, in accordance with various embodiments of the present teachings. The exemplary fuser belt 1040 can include a substrate 1042 and a top coat layer 1044 disposed over the substrate 1042. The substrate 1042 can be any suitable high temperature plastic substrate, such as, for example, polyimide, polyphenylene sulfide, polyamide imide, polyketone, polyphthalamide, polyetheretherketone (PEEK), polyethersulfone, polyetherimide, and polyaryletherketone. The top coat layer 1044 can include a plurality of passivated aluminum nitride particles 1020" substantially uniformly dispersed in at least one of a fluoropolymer and a fluoroelastomer 1010", such that the plurality of passivated aluminum nitride particles 1020" can increase a thermal conductivity of the top coat layer 1044. In various embodiments, each of the plurality of passivated aluminum nitride particles 1020" can include a passivation layer 224, 324 disposed over the aluminum nitride particle core 222, 322, as shown in FIGS. 2 and 3. In certain embodiments, the passivation layer 224, 432 can include the condensation reaction products of fluorinated monomers and can be formed as shown in the reaction scheme 2.

In some embodiments, the exemplary fuser belt 1040 can include a compliant layer disposed between the substrate 1042 and the top coat layer 1044, Exemplary material for the compliant layer can include, but is not limited to, silicone rubbers such as room temperature vulcanization (RTV) silicone rubbers; high temperature vulcanization (HTV) silicone rubbers; and low temperature vulcanization (LTV) silicone rubbers. Exemplary commercially available silicone rubbers include, but is not limited to, SILASTIC® 735 black RTV and SILASTIC® 732 RTV (Dow Corning Corp., Midland, Mich.); and 106 RTV Silicone Rubber and 90 RTV Silicone Rubber (General Electric, Albany, N.Y.). Other suitable silicone materials include, but are not limited to, Sylgard® 182 (Dow Corning Corp., Midland, Mich.) siloxanes (preferably polydimethyisiloxanes); fluorosilicones such as Silicone Rubber 552 (Sampson Coatings, Richmond, Va.); dimethylsilicones; liquid silicone rubbers such as, vinyl crosslinked heat curable rubbers or silanol room temperature crosslinked materials; and the like.

Figure 11:
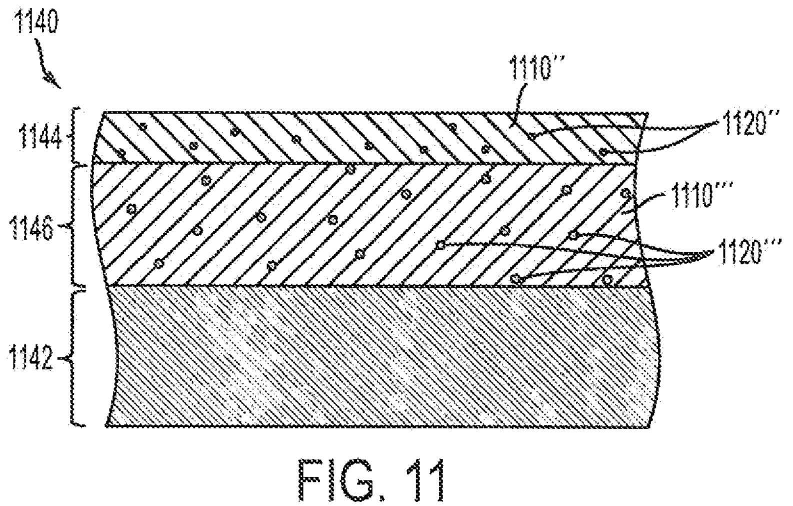

FIG. 11 shows another exemplary embodiment 1140 of the fuser belt 540, 1040, the fuser belt 1140 including a compliant layer disposed between the substrate 1142 and the top coat layer 1144. In various embodiments, the compliant layer 1146 can include a plurality of passivated aluminum nitride particles 1120''' substantially uniformly dispersed in a silicone elastomer 1110'''. Each of the plurality of passivated aluminum nitride particles 1120''' can include a passivation layer 224, 324 disposed over an aluminum nitride particle core 222, 322, as shown in FIGS. 2 and 3. In various embodiments, the passivation layer 224, 324 can include silicone elastomeric oligomers and can be formed as shown in the reaction scheme 3.

Figure 12:
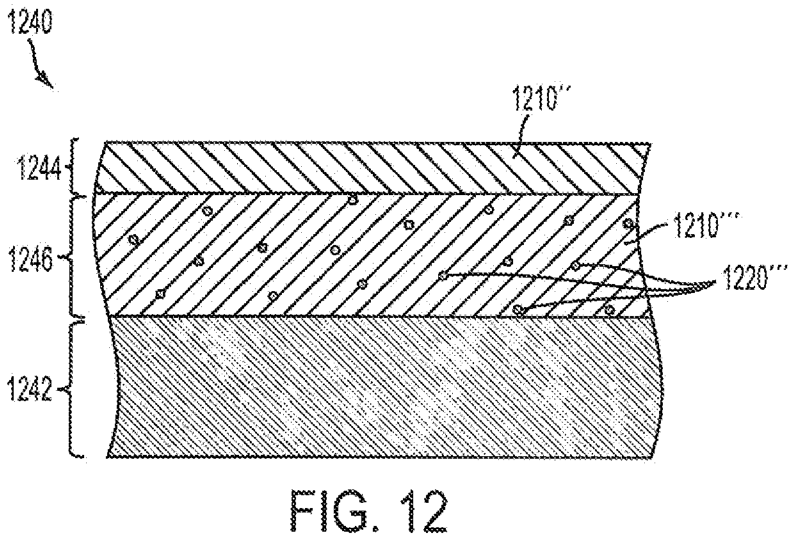

FIG. 12 shows another exemplary embodiment 1240 of the fuser belt 540, 1040, 1140, the fuser belt 1240 including a compliant layer 1246 disposed between the substrate 1242 and the top coat layer 1244 and only the compliant layer 1246 include passivated a plurality of passivated aluminum nitride particles 1120''' substantially uniformly dispersed in a silicone elastomer 1110'''. The substrate 1142 can be any suitable high temperature plastic substrate, such as, for example, polyimide, polyphenylene sulfide, polyamide imide, polyketone, polyphthalamide, polyetheretherketone (PEEK), polyethersulfone, polyetherimide, and polyaryletherketone. The top coat layer 1144 can include one or more of a fluoropolymer and a fluoroelastomer, wherein the one or more of a fluoropolymer and a fluoroelastomer can include one or more monomer repeat units such as, for example, tetrafluoroethylene, perfluoro(methyl vinyl ether), perfluoro(propyl vinyl ether), perfluoro(ethyl vinyl ether), vinylidene fluoride, hexafluoropropylene, and the mixtures thereof. Exemplary top coat layer 1144 can include, but is not limited to, polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

For various embodiments of fuser belts shown in FIGS. 6-12, the substrate 642, 742, 842, 1242 can include the plurality of passivated aluminum nitride particles 620', 720', 820' in an amount ranging from about 0.01 weight % to about 50 weight % of the total weight of the passivated particles 620', 720', 820', 1210' and the polyimide 610', 710', 810', 1210'. In some embodiments, the top coat layer 744, 944, 1044, 1144 can include the plurality of passivated aluminum nitride particles 720", 920", 1020", 1120" in an amount ranging from about 0.01 weight % to about 50 weight % of the total weight of the passivated particles 720", 920", 1020", 1120" and the one or more of a fluoropolymer and a fluoroelastomer 710", 910", 1010", 1110". In other embodiments, the compliant layer 846, 946, 1146, 1246 can include the plurality of passivated aluminum nitride particles 820''', 920''', 1120''', 1220''' in an amount ranging from about 0.01 weight % to about 50 weight % of the total weight of the passivated particles 820''', 920''', 1120''', 1220''' and the silicone elastomer 810''', 910''', 1110''', 1210'''. In various embodiments, the plurality of passivated aluminum nitride particles 620', 720', 820', 720", 920", 1020", 1120", 820''', 920''', 1120''', 1220''' can include one or more of spherical particles 220, as shown in FIG. 2 and high aspect ratio particles 320, as shown in FIG. 3. In certain embodiments, the plurality of passivated aluminum nitride particles 620', 720', 820', 720", 920", 1020", 1120", 820''', 920''', 1120''', 1220''' can include particles having at least one dimension in the range of about 5 nm to about 5 μm and in some cases from about 10 nm to about 2 μm. Furthermore, reaction schemes 1, 2, and 3 are exemplary reaction scheme, a person of ordinary skill in the art can use any other suitable reaction scheme and any other monomers to form a passivation layer 224, 324 over the core 222, 322 of the aluminum nitride particles, 220, 320, 620', 720', 820', 720", 920", 1020", 1120", 820'", 920'", 1120'", 1220'".

While the present teachings has been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A composite material comprising:

a polyimide resin having a thermal conductivity; and a plurality of passivated aluminum nitride particles substantially uniformly dispersed in the polyimide resin to provide the composite material with a thermal conductivity of about 0.4 W/mK to about 2.5 W/mK, wherein each of the plurality of passivated aluminum nitride particles comprises a passivation layer disposed over an aluminum nitride particle core to inhibit oxidation and thermal degradation of a surface of the aluminum nitride particle core.

2. The composite material of claim 1, wherein the passivation layer comprises condensation reaction products of monomers selected from the group consisting of 4,4'-oxydianiline, pyromellitic dianhydride, polyamic acid, BTDA (benzophenonetetracarboxylic acid), 1,4-benzenediamine MPD (4,4'-methylenebisbenzeneamine), and BTDE (4,4'-carbonyibis(1,2-benzenedicarboxylic acid).

3. The composite material of claim 1, wherein the plurality of passivated aluminum nitride particles comprises one or more of spherical particles and high aspect ratio particles.

4. The composite material of claim 1, wherein the plurality of passivated aluminum nitride particles comprises particles having at least one dimension in the range of about 5 nm to about 5 μm.

5. The composite material of claim 1, wherein the plurality of passivated aluminum nitride particles are present in an amount ranging from about 0.01 weight % to about 50 weight % of the total weight of the composite material.

6. The composite material of claim 1, wherein the passivation layer comprises a shell over the aluminum nitride particle core.

* * * * *